3,140,934
PERCHLORYL FLUORIDE PURIFICATION
PROCESS
Harry C. Mandell, Jr., Abington, and Gerhard Barth-Wehrenalp, Ambler, Pa., assignors to Pennsalt Chemicals Corporation, Philadelphia, Pa., a corporation of Pennsylvania
No Drawing. Filed Mar. 13, 1961, Ser. No. 95,022
2 Claims. (Cl. 55—71)

This invention relates to a method for removing perchloryl fluoride from an atmosphere. More particularly, it relates to the purification of air contaminated with perchloryl fluoride in order to render the air breathable.

Perchloryl fluoride is a relatively new compound having strongly oxidative properties under certain conditions. It possesses a characteristic sweet odor which is detectable well below its toxic level. Its uses as an oxidant and as a chemical intermediate are growing rapidly.

While the toxicity of perchloryl fluoride is classed as moderate, competent medical authorities have suggested that the hygienic standard for man of perchyoryl fluoride in air should not exceed 5 p.p.m. for exposure over a long period of time. Therefore, it is important that there be available a means for rendering air containing more than 5 p.p.m. of perchloryl fluoride safely breathable for persons working in such an atmosphere. Also, when spillages or leaks of perchloryl fluoride occur, it is desirable that there be available a means for safely recovering and removing the perchloryl fluoride gas from an enclosed area. The present invention is directed to a method for achieving the above objectives.

Many adsorptive materials are known which serve to remove various impurities from air. However, none of these materials have been hitherto known to be useful as an adsorbent for perchloryl fluoride. For example, activated charcoal is one of the commonest of the adsorbents particularly used in gas masks worn by persons working in contaminated atmospheres. However, activated charcoal and perchloryl fluoride-air mixtures react even at very dilute concentrations to form carbon dioxide and to cause a temperature rise in the adsorbent. Thus, an air stream containing 1% by volume of perchloryl fluoride on flowing through a bed of activated charcoal causes the temperature of the bed to rise to 200° C. in about 3 minutes. At a 30% concentration of perchloryl fluoride in air, ignition of the charcoal occurs and is followed by vigorous combustion.

Experimentation with another common gas mask adsorbent material, activate alumina, resulted in the finding that perchloryl fluoride is decomposed by the alumina with evolution of much heat and the formation of corrosive gases. A similar result is obtained with activated silica. Thus, all the above commonly used adsorbents for gas masks are unsuitable as adsorbents for such purpose in the presence of perchloryl fluoride.

We have now unexpectedly found that synthetic alkali metal alumina silicates, i.e., synthetic zeolites, of a particular minimum pore size can be effectively and safely used as adsorbents for perchloryl fluoride, particularly in a gas mask cannister.

The synthetic zeolites are materials identified commercially as molecular sieves. They are available from Linde Air Products Company and from Davision Chemical Division, W. R. Grace & Company. The synthetic zeolites have a crystalline structure consisting of a large number of small cavities interconnected by many smaller openings or pores. They are further characterized as a three-dimensional network with mutually connected intracrystalline voids accessible through the larger openings. The voids or pores are precisely uniform in size, so that only molecules of smaller diameter than the pores can enter the pores and be adsorbed. Larger-sized molecules pass over the surface of the sieve and can thus be separated from smaller-sized molecules.

In view of the strong reactivity of perchloryl fluoride with activated alumina and activated silica, it was surprising to find that no chemical reaction occurs between the molecular sieve synthetic zeolites and perchloryl fluoride. Furthermore, it was found that perchloryl fluoride passes freely through a bed of molecular sieve having pores measuring 4 Angstrom units in diameter but that perchloryl fluoride is completely adsorbed in a bed of molecular sieve having pores measuring at least 5 Angstrom units in diameter.

It was found also that the adsorptive rate and capacity of the molecular sieve No. 5A (Linde designation for 5 Angstrom pore size molecular sieve) were both high. For example, one pound of $\frac{1}{16}$" pellets of molecular sieve No. 5A was found to hold about 0.15 lb. of perchloryl fluoride at a feed rate of 1.5 liters per minute of a perchloryl fluoride-nitrogen mixture containing 100,000 p.p.m. of perchloryl fluoride, with no perchloryl fluoride appearing in the effluent gas stream.

In practicing the invention, a gas mask cannister is filled with an adequate amount of $\frac{1}{16}$" pellets of molecular sieve having at least 5 Angstrom pore size, as the adsorbent therein, and is attached to a gas mask in the usual way for use by personnel working in or entering into a contaminated area. By means of the molecular sieve adsorbent, the air is purified to a safely breathable perchloryl fluoride content. Saturation of the adsorbent in the cannister is readily determined by detection of the sweet odor of perchloryl fluoride coming into the mask.

In further practicing the invention, a large-sized container filled with $\frac{1}{8}$" or larger sized pellets of molecular sieve No. 5A is attached to the inlet of a circulating air blower and is used to continually purify the air in a room in which perchloryl fluoride is being handled.

The adsorbed perchloryl fluoride is readily removed from the molecular sieve by purging the bed with air heated to about 120–250° C. It is known that the adsorptive properties of molecular sieves are lost at highly elevated temperatures, therefore excessive temperatures should be avoided. After purging, the sieve is cooled and is ready for reuse as an adsorbent bed for perchloryl fluoride. In many cases the use of the hot air purge at a temperature of about 150° C. will be found adequate for regeneration of the bed.

The amount of molecular sieve No. 5A which is used and the size and shape of the gas mask cannister will depend on the service conditions under which the adsorption of perchloryl fluoride is to be carried out. This aspect of the design of a suitable cannister presents no particular problem except that precautions should be taken to avoid materials of construction which might be retactive with perchloryl fluoride at elevated temperatures, particularly during the regeneration step.

Although the molecular sieve with pores of at least 5 Angstrom size is the size of adsorbent found successful for practice of the invention, it is to be understood that synthetic zeolite molecular sieves having pores above the 5 Angstrom pore size, i.e., those having up to about a 13 Angstrom pore size may also be used in keeping with the scope and spirit of this invention.

Following are examples representing the practice of the present invention:

*Example 1*

360 g. of $\frac{1}{16}$" pellets of molecular sieve No. 5A were placed in a tower measuring about 1" I.D. x 45" long. A mixture of perchloryl fluoride with nitrogen was prepared containing 1000 parts of perchloryl fluoride per million parts of mixture. 4.25 liters of the mixture were passed through the tower at room temperature at the rate of 1 liter per minute. 0.26 g. of perchloryl fluoride was adsorbed. No perchloryl fluoride was detected in the effluent gas from the tower.

*Example 2*

Using the same charge of molecular sieve No. 5A in the same tower as in Example 1, a mixture of perchloryl fluoride and nitrogen containing 10,000 p.p.m. of perchloryl fluoride was passed through the tower at rates varying from 1 to 2.5 l./min. An additional 2.66 g. of perchloryl fluoride, bringing the total to 2.92 g., were adsorbed with no detection of perchloryl fluoride in the effluent gas.

*Example 3*

Using the same charge of molecular sieve No. 5A in the same tower as in the preceding two examples, a mixture of perchloryl fluoride and nitrogen containing 50,000 p.p.m. of perchloryl fluoride was passed through the tower at rates varying from 1 to 2 l./min. An additional 13.35 g. of perchloryl fluoride were adsorbed, bringing the total to 16.27 g., with no detection of perchloryl fluoride in the effluent gas. Upon increasing the throughput rate to 3 l./min., a slight amount of perchloryl fluoride was detected in the effluent stream.

*Example 4*

Using the same charge of molecular sieve No. 5A in the same tower as in the preceding examples, a mixture of perchloryl fluoride and nitrogen containing 100,000 p.p.m. of perchloryl fluoride was passed through the tower at rates varying from 0.3 to 1.5 l./min. An additional 26.6 g. of perchloryl fluoride were adsorbed, bringing the total to 42.87 g., with no detection of perchloryl fluoride in the effluent gas. Upon increasing the throughout rate to 2 l./min., a slight amount of perchloryl fluoride was detected in the effluent stream.

*Example 5*

The tower containing the pellets of molecular sieve No. 5A used in Examples 1–4 was purged with air heated to about 250° C. The perchloryl fluoride was desorbed from the adsorbent bed. The bed then was cooled. Upon weighing, it was found that the bed weighed 367 g. as compared to 358.8 g. at the start, an increase of 2.3%. The bed was found to be suitable for reuse as an adsorbent for perchloryl fluoride.

*Example 6*

A cannister-type tower was packed with 680 g. of $\frac{1}{16}''$ pellets of molecular sieve No. 4A as an adsorbent. Perchloryl fluoride was passed through a water bath and then into the tower at a rate of about 0.3 l./min. The outlet of the tower was connected to a trap cooled with solid carbon dioxide in acetone. Substantially all the perchloryl fluoride charged to the tower passed through and collected in the trap. The weight of the adsorbent bed was found unchanged, confirming that no perchloryl fluoride had been adsorbed.

*Example 7*

An industrial type gas mask cannister measuring about 3″ in diameter and about 7″ in length and having a bottom air inlet valve and a top air outlet is charged with molecular sieve No. 5A. The air outlet of the cannister is connected by a flexible hose to the face piece of an industrial type gas mask. The assembled gas mask is worn by a person working in an atmosphere of air containing perchloryl fluoride in contaminant amounts, i.e., more than about 5 p.p.m. The contaminated air entering through the air inlet valve is rendered free of perchloryl fluoride in the cannister, so that the air entering the face piece and being breathed is safe for breathing.

The above-described embodiments are presented for the purpose of illustration. As many widely different embodiments of this invention can be made without departing from the spirit and scope thereof, it is to be understood that the invention is not intended to be limited by the above specific embodiments.

We claim:

1. A method for rendering breathable air contaminated with perchloryl fluoride which comprises intimately contacting air containing perchloryl fluoridme as an impurity therein with an adsorbent consisting of a synthetic alkali metal alumina silicate characterized by a three dimensional network with mutually connected intra-crystalline voids accessible through openings of at least 5 Angstroms in diameter.

2. A method for adsorbing perchloryl fluoride which comprises intimately contacting perchloryl fluoride with an adsorbent consisting of a synthetic alkali metal alumina silicate characterized by a three dimensional network with mutually connected intracrystalline voids accessible through openings of at least 5 Angstroms in diameter.

References Cited in the file of this patent

UNITED STATES PATENTS

| | | |
|---|---|---|
| 1,963,874 | Stampe | June 19, 1934 |
| 2,951,552 | Cannon | Sept. 6, 1960 |
| 3,001,607 | Eng et al. | Sept. 26, 1961 |

OTHER REFERENCES

"Examine These Ways to Use Selective Adsorption," article in Petroleum Refiner, volume 36, No. 7, July 1957.